Patented Jan. 4, 1938

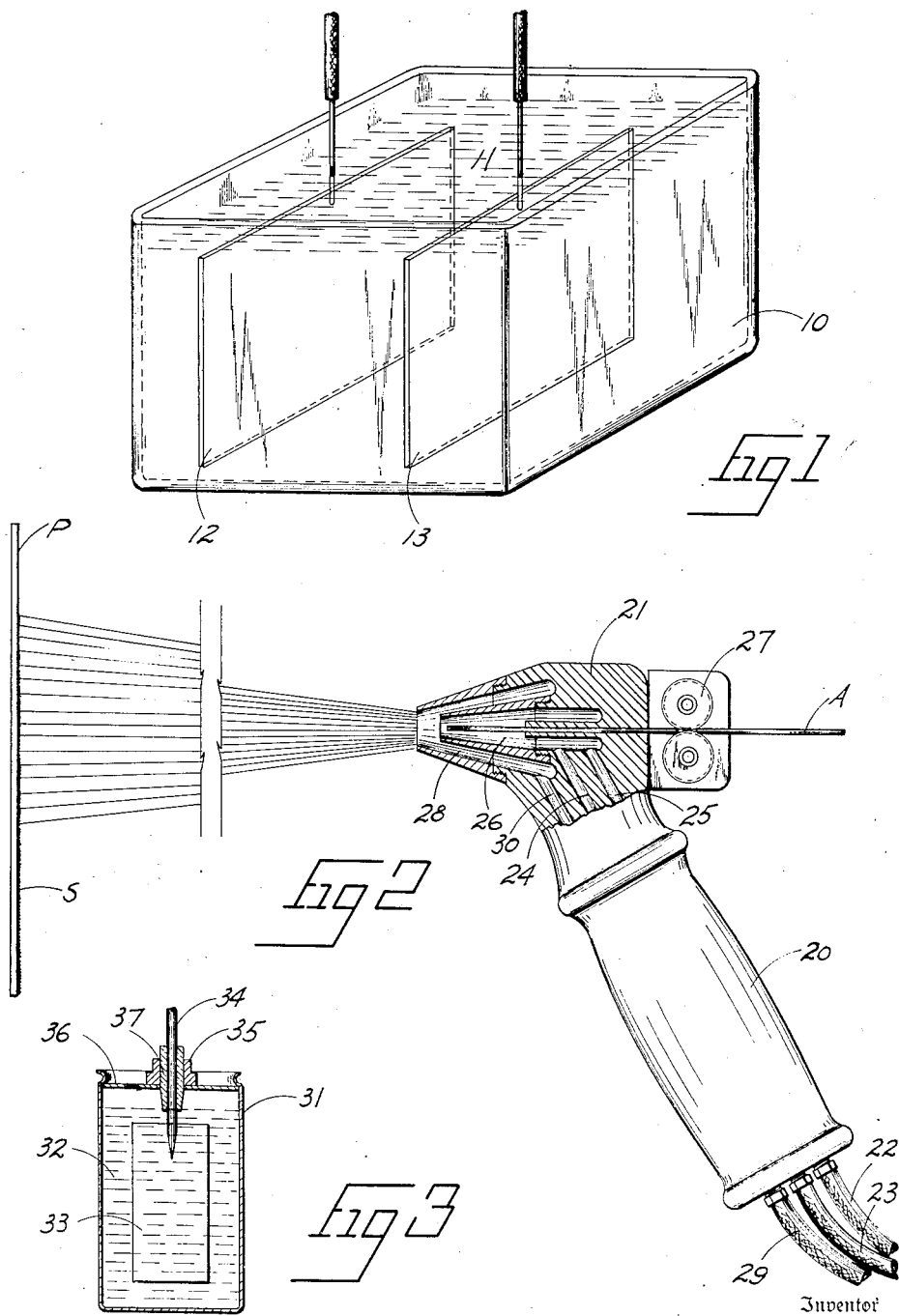

2,104,018

UNITED STATES PATENT OFFICE 2,104,018

ELECTROLYTIC DEVICE AND METHOD OF MAKING SAME

Joseph B. Brennan, Fort Wayne, Ind.

Application March 22, 1933, Serial No. 662,107

11 Claims. (Cl. 175—315)

This invention relates to plates adapted for use, for example, in condensers and electrolytic devices, and methods of making the same, and in this application the invention is described particularly with reference to electrolytic condensers of a type in general use in radio receivers, motor starting devices, power factor correcting devices, etc.

Condensers of this type ordinarily comprise anodes formed of aluminum or other suitable film forming metal, and suitable cathodes. The anodes and cathodes are immersed in a suitable electrolyte such as an aqueous solution of borax and boric acid. In this type of condenser, the anode forms one plate, a film on the surface of the anode forms the dielectric, and the electrolyte itself forms the other plate. The high capacity of these condensers is thought to be due to the extreme thinness of dielectric film. Heretofore the capacities have been a function of the plane area of the anode, i. e. the film.

An object of my invention is to provide an electrolytic condenser of substantially the same mass and volume as prior condensers which will have a capacity many times greater than prior types of condensers having anodes of substantially the same plane area. Another object of my invention is to provide a plate adapted for use in condensers as an anode which will have a relatively large capacity per unit of plane area. A further object of my invention is to provide a plate which can be easily and cheaply manufactured. Another object of my invention is to provide a condenser which will have a low resistance. Another object is to provide a method of increasing the capacity of a condenser ten or more times per unit of plane area of the anode. Another object is to increase the area and extent of the dielectric film per unit of plane area of the plate upon which the film is formed. A further object is to provide a condenser which will be durable and which will retain its capacity and efficiency over long periods of time.

Other objects and advantages of my invention will become apparent from the following description of a preferred form thereof, reference being made to the accompanying drawing, in which:

Figure 1 is a diagrammatic illustration of an electrolytic condenser embodying my invention;

Figure 2 diagrammatically illustrates a form of apparatus which I may use in forming the plates to carry out the objects of my invention; and Figure 3 illustrates a practical embodiment of my invention in an electrolytic condenser.

As illustrated in Figure 1 of the drawing, an electrolytic condenser made according to my invention may comprise a container 10 having an electrolyte 11 therein, and a cathode 12 and anode 13 immersed in the electrolyte. The electrolyte may comprise any suitable material such as a solution of borax and boric acid. The cathode 12 may be formed of copper or any other suitable material. The anode, according to my invention, regardless of its other characteristics, has a surface of substantially pure aluminum or other film forming metal.

I have found that by building up the anode surface to embody a highly developed microscopic porosity, I can increase the capacity of the condenser many times without increasing the plane area of the anode. Apparently this increase in capacity is due primarily, if not entirely, to an increase in the area of the dielectric film which coats the microscopic interstices of the porous surface.

To produce this apparently porous surface I preferably deposit finely divided metal on a suitable base. Various methods may be employed for building up the apparently porous condition in the deposited metal. For example, the metal may be melted and the molten metal atomized and sprayed onto a suitable base by a gaseous blast. By varying the temperature of the metal, the distance from the atomizer to the base on which the metal is being sprayed, the force and temperature of the blast and various other factors, the size and character of the particles of molten metal can be controlled to produce a surface having such characteristics as I desire.

I am able to obtain satisfactory results by melting aluminum of high purity (preferably 99.7% pure) with an oxy-acetylene flame at a temperature of something over 1200° F., atomizing the molten metal by means of a blast of compressed air, and projecting the molten metal onto a base held about 10 to 20 inches away from the nozzle of the air jet.

A well known form of apparatus which I have found to be satisfactory in carrying out the spraying operation is illustrated more or less diagrammatically in Figure 2 of the drawing. This comprises a gun having a handle 20 and a head 21. Oxygen and acetylene or other suitable gases may be supplied by flexible tubes 22 and 23 which are connected to passageways 24 and 25 extending through the handle and terminating in a mixing chamber 26. The film forming metal such as aluminum is supplied by a wire A which is fed into the center of the mixing chamber by feeding mechanism 27. The metal is melted by the flame, and atomized by a blast of compressed air or other suitable gas, at a pressure of about 60 pounds per square inch supplied to the annular chamber 28 through the passageway 30 and the flexible tube 29. The atomized metal is directed toward the plate P which forms the base on which the film forming metallic surface S is deposited. The gun may be manipulated by hand to produce an even deposit of the desired thickness. As stated above I have obtained good results by holding the gun from 10 to 20 inches away from the plate, and depositing layers of from .003" to .015" in thickness. Of course, different distances may be employed, and if desired successive layers of film forming metal may be deposited on the base.

As I have observed and practiced the atomization and spraying of the molten metal, the very finely divided molten or plastic particles impinge upon the base with sufficient force to adhere thereto and to cohere to each other. Under the conditions and with the apparatus described above, the minute particles cohere to each other without forming a continuous solid surface structure, but form a highly porous layer which is vastly pocketed and traversed with microscopic valleys and tunnels and which, while appearing generally even to the eye, is microscopically honey-combed, roughened and dented throughout. The microscopically observable area of such surface is many times that of the plane area, and all of the area afforded by the porosity and microscopic irregularity of the surface is susceptible of receiving and being coated with a dielectric film which, in the aggregate, is many times greater in area than the plane area of the surface. The film forming surface, in proportion to the plane area of the plate or anode, is tremendously increased and the capacity of the condenser, when the plate is used as the anode of an electrolytic condenser, is also tremendously increased per unit of plane area of plate or anode.

It will be appreciated that where the electrolyte acts as one plate of such a condenser the electrolyte will flow into the minute interstices in the surface of the anode and will have an active surface complimentary to the microscopically porous metallic surface of the anode—the anode and the electrolyte being separated from each other only by the dielectric film which covers the honey-combed or porous surface of the plate. The gross microscopic area within the porous surface may be increased by depositing thicker layers or successive layers of metal thereon so long as the whole surface so deposited retains its porous or spongy character.

One manner of carrying out my invention is to spray atomized aluminum on an aluminum plate using, as I have noted above, very pure aluminum, preferably 99.7% pure, or better, to build up a porous layer or outer surface to a depth of about ten thousandths of an inch. A plate having such a surface, when coated with a film as hereinafter described, will, in an electrolytic condenser, have a capacity of about one and one-half microfarads per square inch of plane area. Smooth aluminum plates of the same material have less than about six hundredths of a microfarad of capacity under the same conditions.

The deposit of film forming metal can be formed on any suitable base, for example I have successfully sprayed aluminum onto bases consisting of aluminum, various other metals, paper, wax, phenolic condensation products, rubber, glass, cloth, sand, etc. Any convenient shape of base can be employed. The deposited material may be removed from the base, or used in conjunction therewith to form the finished plate, depending upon the character of the material used as a base.

After the porous surface is produced, I form the dielectric film thereon, preferably by immersing the anode plate in the electrolyte of an aqueous solution of borax and boric acid and causing a unidirectional current to flow therethrough; the positive pole of the source of current being connected to the anode plate. The voltage is regulated so that the initial current will be about 10 amperes per ultimate microfarad to be deleveped on the finally formed and coated plate. As the forming operation continues, the flow of current drops to about 0.5 milli-ampere or less per microfarad under a potential of about 700 volts. During the forming operation, I prefer that the temperature of the electrolyte be maintained at about 90° C. In this manner the forming may be completed in about an hour or an hour and a half. The dielectric film apparently covers the surfaces of each of the minute particles which make up the plate surface, and when formed as outlined above the film has sufficient dielectric strength to stand up under operating potentials of more than 400 volts.

When the plates have been formed, the complete condensers may be assembled. A practical adaptation of my invention, as illustrated in Figure 3, may comprise a container 31 of non-filming metal which forms the cathode and which also contains the electrolyte 32. The anode plate 33, produced according to my invention, may be suspended within the electrolyte by means of a rod 34 which is carried by an insulated nipple 35 mounted on the vented cover 36. The insulation 37 preferably extends below the level of the electrolyte in the container to prevent corrosion of the rod.

In the condenser illustrated in Figure 3, the anode 32 comprises an aluminum plate treated according to my invention having a plane area on each side of about three-quarters of a square inch or a total plane area of one and one-half square inches. With my plate used as an anode this condenser will have a capacity of more than two microfarads. Previous types of electrolytic condensers require about 36 square inches of plane area of anode for a similar capacity. Thus it will be seen that I have many times increased the capacity per unit of plane area of anode.

By reason of the greatly increased capacity per unit of area, I am able to make very compact condensers having low resistance and by reason of the simplicity of my method condensers made according to my invention can be manufactured for a fraction of the cost of ordinary types of condensers. Furthermore, condensers made by my method are durable and retain their efficiency and capacity over long periods of time.

In the foregoing specification, I have described a preferred form of my invention as applied to an electrolytic condenser. Various changes and modifications in my invention will be apparent to those skilled in the art and it will be evident that my invention may be applied to other types of condensers and electrolytic devices. Accordingly, it is to be understood that my patent is not limited to the specific form disclosed herein or in any manner other than by the appended claims.

I claim:—

1. An electrode having a surface of film forming metal and a dielectric film thereon, the surface comprising a great number of minute particles of film forming metal deposited to form a porous or spongy mass, the dielectric film conforming to the surfaces of the particles whereby the area of dielectric film on the electrode is many times greater than the plane area thereof.

2. In an electrolytic condenser having a non-filming cathode and a film-forming electrolyte, an anode adapted to be immersed in the electrolyte and having a porous surface of film forming material and having a dielectric film formed co-extensive with the irregularities in the porous surface whereby the effective surface area of the film on the anode is many times greater than the plane area of the anode.

3. An electrode for electrolytic devices having a reticulated porous surface composed of minute cohering particles of film forming metal, and a dielectric film formed on the surfaces of the particles and conforming thereto.

4. In an electrolytic device, the combination of a film-forming electrolyte, an electrode immersed therein having a reticulated porous surface composed of minute cohering particles of film forming metal.

5. An anode plate for an electrolytic condenser made of 99.7% pure aluminum having a porous surface about 10 thousandths of an inch in thickness composed of minute cohering particles of aluminum deposited thereon, and having a dielectric film formed on the surfaces of the particles, the effective area of the film being greatly in excess of the plane area of the anodes.

6. The method of making anodes which comprises projecting minute particles of molten metal onto a base in such a manner that each particle makes an electrical contact with another particle throughout a portion of its area and forming a dielectric film on the remaining portion of the area of the particles and conforming to the configuration of the particles.

7. The method of making electrodes for use in electrolytic devices which includes building up particles of film-forming metal into a porous spongy layer and thereafter forming a dielectric film on the exposed surfaces of the particles.

8. The method of making condenser plates which includes the steps of causing finely divided particles of film-forming metal to cohere to form a porous mass of conducting material, and thereafter forming a dielectric film on the surfaces of the particles.

9. The method of making electrodes for use in electrolytic devices which includes the step of causing finely divided particles of film-forming metal to cohere to form a spongy porous mass, and thereafter electroforming a dielectric film on the surfaces of the particles.

10. An electrolytic device comprising in combination a film forming electrolyte, at least two electrodes having surfaces in contact therewith, at least one of said electrodes having a reticulated porous surface composed of minute cohering particles of film forming metal.

11. An electrolytic device comprising in combination a film forming electrolyte, at least two electrodes having surfaces in contact therewith, at least one of said electrodes having a reticulated porous surface composed of minute cohering particles of film forming metal, and a dielectric film formed on the surfaces of said particles in contact with the electrolyte.

JOSEPH B. BRENNAN.